United States Patent [19]

Karl

[11] 3,937,895

[45] Feb. 10, 1976

[54] CIRCUIT ARRANGEMENT FOR DETECTING DOUBLE CONNECTIONS IN DIGITAL TELECOMMUNICATION SWITCHING SYSTEMS

[76] Inventor: Otto Karl, Forstenrieder-Allee 78/III, 8000 Munich 71, Germany

[22] Filed: Feb. 22, 1974

[21] Appl. No.: 444,837

[30] Foreign Application Priority Data

Feb. 22, 1973 Germany............................ 2308855

[52] U.S. Cl....... 179/15 AT; 179/15 BF; 179/18 AH
[51] Int. Cl.² .......................................... H04J 3/00
[58] Field of Search....... 179/18 AH, 15 AT, 15 BF, 179/18 J

[56] References Cited
UNITED STATES PATENTS

| | | | |
|---|---|---|---|
| 3,637,946 | 1/1972 | Hamrick | 179/18 AH |
| 3,740,484 | 6/1973 | Laggy | 179/15 AT |
| 3,760,107 | 9/1973 | Duerdoth | 179/15 BF |

Primary Examiner—Ralph D. Blakeslee

[57] ABSTRACT

Apparatus is described for detecting undesirable duplications in connections in time division multiplex telecommunication systems, e.g., pulse code modulated telephone systems. The multiplex trunks are coupled through time coupling stages which may take the form of storages allocated to individual trunks, and the trunks are connectable in pairs, by means of crosspoint switches, over pairs of time multiplex channels to outgoing time division multiplex trunks. A parity generator and an OR gate are inserted between the trunk-challel side terminals of the crosspoint switches extending from the incoming trunk in question to the same trunk and the trunk in question. An output of the parity generator is coupled, along with an output of the OR gate, to an exclusive OR gate, which produces an output signal responsive to a dissimilarity in inputs. The appearance of the latter output signal indicates the existence of a double connection.

1 Claim, 1 Drawing Figure

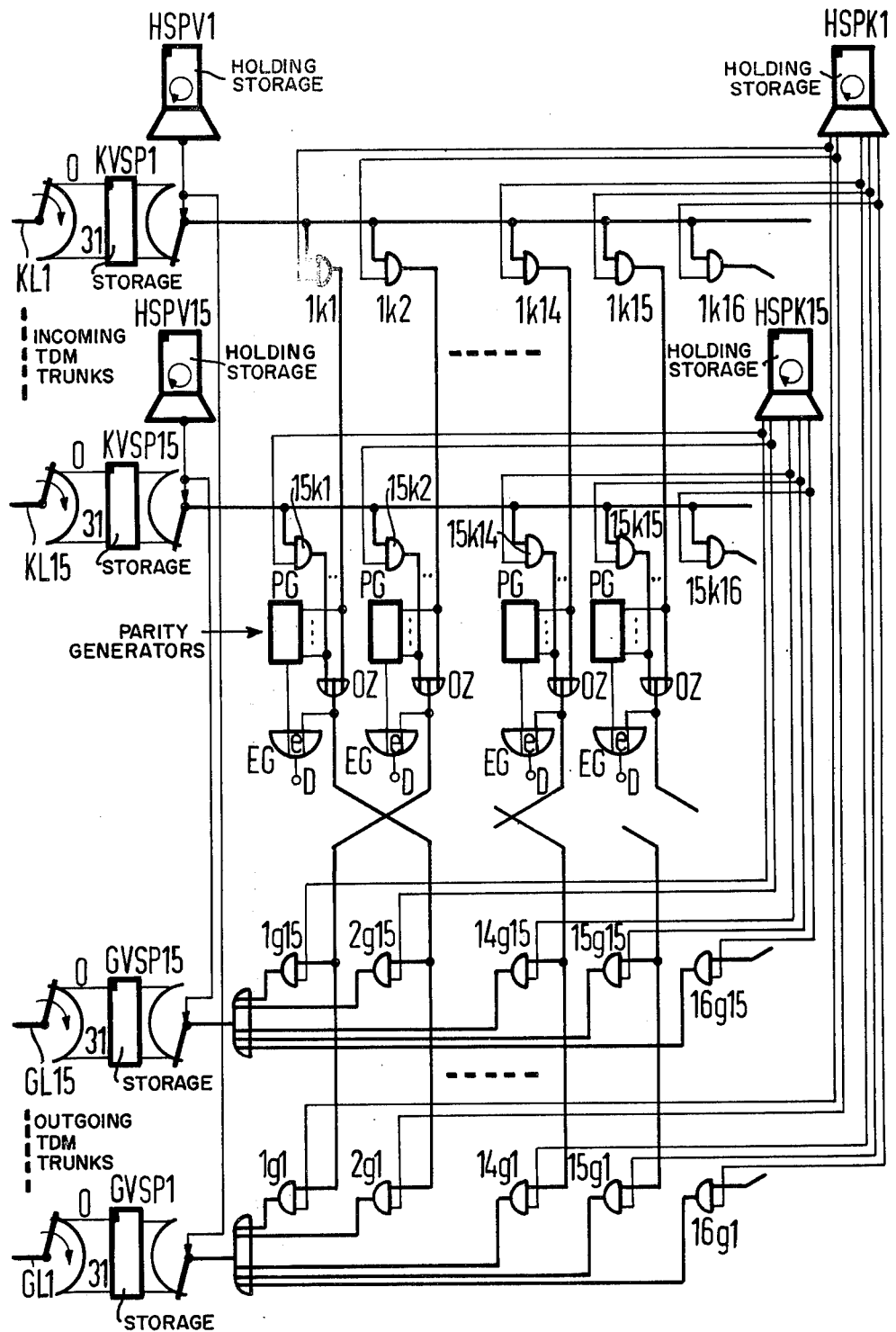

CIRCUIT ARRANGEMENT FOR DETECTING DOUBLE CONNECTIONS IN DIGITAL TELECOMMUNICATION SWITCHING SYSTEMS

BACKGROUND OF THE INVENTION

In automatic telecommunication exchanges it is desirable to avoid double connections, i.e., undesirable connections between two parties already connected with each other and a third party. Such double connections may occur in conventional automatic exchanges, because two selector means test at approximately the same time one and the same line for its idle condition and attempt to seize it. Since, at first, both selector means find the line in the idle condition, the corresponding test switching means in both selector means may also respond, seizing the idle line. Such a double seizure occurs more readily, the longer the period needed by the test switching element to respond and, thus, to seize the line in question and to prevent further intrusion. Consequently, in conventional switching systems efforts are made to minimize the danger period in which double connections may occur.

Modern telecommunication exchange technology has developed switching systems in which, in contrast to conventional telecommunication systems, more particularly telephone exchange systems, where transmission of continuous analog signals on a time-division basis takes place in transmission channels separated physically from one another, the time-division multiplex principle is applied instead of the space-division multiplex principle, and in which discontinuous analog or digital signals are transmitted on a time-division basis.

In contrast to conventional switching systems, the pieces of information concerning existing connections in these switching systems are not stored in relays or similar elements distributed along the communication path, but they are stored in concentrated form in addressable cyclic memories indicating circuit sections to be connected with one another. In such a time-division multiplex (T.D.M.) telecommunication switching system, more particularly a telephone exchange system, it is possible from the start to avoid undesirable double connections by separately processing within a given time the switching operations relating to the individual parties. A requisite condition is faultless transmission and processing of the elements of information needed for setting up and releasing the connections. However, it cannot be ruled out that unfavorable circumstances, e.g. faulty processing or transmission of such pieces of information or the appearance of interference pulses, nevertheless lead to an undesirable double connection.

To avoid undesirable double connections in such a switching system, it is old in the art (West German Pat. No. 1,225,246) to provide counter means which transmits a signal identifying a double connection in case of similarity, at least twice, between addresses. This signal can be used as a criterion for delivering an instruction for the release of the connections in which the subscriber line with the address currently being supplied from the address register participates. Such an operation is carried out when companing addresses of subscribers participating in connections with an address supplied for a line currently being interrogated as to its loop condition.

This procedure permits the avoidance of double connections which are attributable to the fact that time channel switches which in regular operation must be operated pulsewise one time only, are operated faultily more than once within a period of operation the TDM system. This is acceptable for TDM switching systems in which only time slot switches are provided in the individual communication paths which are to be operated pulsewise only one time within a period of the TDM system.

There are, however, TDM switching systems having a more comples construction in which there are switches in the individual transmission paths in addition to or instead of the time slot switches, depending on the existing connections in the TDM switching system, which in regular operation must also be operated in a fairly large number of time slot positions, depending on the number and nature of the existing connections. These switches may be crosspoint switches, by means of which TDM trunks can be connected to TDM links over which the individual TDM trunks can be interconnected.

In this connection it is old in the art (German Pat. No. 2,148,395) to provide counters in switching systems in which the individual TDM trunks of at least one group of incoming TDM trunks can be connected with the individual TDM trunks of at least one group of outgoing TDM trunks over TDM links by means of crosspoint switches, which are each connected to a TDM trunks and a TDM link in which an address in a cyclic memory is provided for each incoming and outgoing TDM highway in which storage are written in the time slot positions allocated to the connections concerned the addresses of the crosspoint switches currently connecting the TDM trunk concerned with a TDM link provided by the address of the TDM link in question. These counters are allocated to individual TDM links and count cyclically one after another in the individual time slot positions the crosspoint addresses stored in the individual address delay time storage. Further, they generate a signal indicating a double connection upon the second appearance of one and the same crosspoint address for the purpose of avoiding double connections.

In addition, to avoid double connections in TDM telecommunication switching systems, more particularly TDM telephone switching systems of the time referred to above, it is old in the art (West German application Ser. No. P 21 48 410.6–31) to provide a cyclic memory having a cycle time corresponding to the duration of a time channel and receiving only one crosspoint address and containing cyclically one after another the crosspoint addresses stored in the individual time slot positions in the individual address cuclic stores, and to provide a comparator that during the storing of a crosspoint address compares the latter with the crosspoint addresses stored in the other locations in the cyclic memory in the time slot position concerned. When there is a similarity of addresses, the comparator generates a signal indicating a double connection.

The above known principle, namely to count cyclically, one after another in the individual time slot positions, crosspoing addresses stored in the individual addresses of the cyclic memories with the aid of counters allocated to individual TDM links, whereby a double connection is indicated upon the second appearance of one and the same crosspoint address, respectively, to input cyclically one after another the crosspoint addresses stored in the individual time slot positions in the individual address of a cyclic memory to a special short address cyclic store and to compare therefrom with the crosspoint addresses contained in the other storages in the time slot position concerned. Upon the occurrence of a similarity of addresses, a double connection is indicated, and this enables the avoidance of undesirable double connections in a TDM telecommunication switching system which can be constructed with considerably less engineering effort compared with prior art circuit arrangements. In such a system the individual testing procedures are repeated with a cycle period of e.g. 32 ms, depending on the principle applied in each case. It is therefore an object of the invention described hereinbelow to detect with equally little engineering effort but without the need of routine test procedures undesirable double connections in a TDM digital telecommunication switching system. In accordance with the principles of the invention a circuit arrangement is provided for detecting double connections in TDM digital telecommunication switching systems, wherein incoming TDM trunks which may run over a time coupling stage in the form of storages allocated to individual trunks, can be connected in pairs, by means of crosspoint switches, over pairs of TDM links with outgoing TDM trunks. The outgoing trunks may likewise run over a time coupling stage with storages allocated to individual TDM trunks.

The circuit arrangement, according to the invention, is characterized in that the inputs of a parity generator are connected to the inputs of an OR element inserted between the link side terminals of the crosspoint switches leading from the incoming TDM trunks concerned to one and the same link and the link in question. An output of the parity generator is connected to one input of an exclusive OR element, whose other input is disposed at the output of the OR element. In signals of dissimilarity between its input singals the exclusive OR element generates, at its output, a signal indicating a double connection.

The circuit arrangement according to the invention tests the links for the presence of double and multiple connections involving still other parties in a continuous manner, time element bit for time element bit. It is highly probable that in the case of an erroneously established double or multiple connection there is for the duration of a time element but a similarity between two or, generally speaking, an even number, in the double or multiple connection of information bits that coincide in time. In this circumstance this circuit arrangement is capable of indicating a double connection very rapidly, thereby enabling the release thereof quite early, so that practically speaking no exchange of information can take place between the parties sharing an undesirable double connection.

BRIEF DESCRIPTION OF THE DRAWING

The principles of the invention will be more readily understood by reference to the description of a preferred embodiment given hereinbelow in conjunction with the accompanying single FIGURE drawing in which is illustrated a schematic view of a pulse code modulated (PCM) switching system concluded according to the invention.

DETAILED DESCRIPTION OF THE DRAWING

The drawing shows schematically a PCM time-division multiplex switching system wherein, for example, 15 TDM trunks switched on a 4-wire basis, each comprising one incoming TDM trunk KL1 . . . KL15 and one outgoing TDM trunk GL1 . . . GL15 and connectable with one another or with other time-division multiplex lines switched on a 4-wire basis. The incoming TDM trunks KL1 . . . KL15 are coupled through a time coupling stage in the form of storages KVSP1 . . . KVSP15 allocated to individual TDM trunks. The incoming trunks can be connected in pairs over pairs of TDM links by means of crosspoint switches 1k1, 14g1 . . . 1k14; . . . ; 15k1, 15k2 . . . 15k14; 1g1, 2g1, . . . 14g1; . . . ; 1g15, 2g15. . . . 14g15 with the outgoing TDM trunks GL1 . . . GL15, likewise coupled through a time coupling stage with storages GVSP1 . . . GVSP15 allocated to individual TDM trunks.

The drawing further shows that the individual TDM trunks of the group of TDM trunks switched on a 4-wire basis can also be connected over other crosspoint switches 1k15 . . . 15k15; 15g1 . . . 15g15 with links leading to other groups of TDM trunks switched on a 4-wire basis. The drawing also shows that the individual TDM highways can be connected with a signal processing means allocated to individual TDM highways in a manner known in itself (e.g. German Unexamined Patent Specification 2 108 745) over additional crosspoint switches 1k16 . . . 15k16; 16g1 . . . 16g15.

The storages KVSP1, GVSP1; . . . ; KVSP15, GVSP15 allocated to individual TDM trunks are conventional cyclic memories and are accessed cyclically in a known manner using the clock pulses of the PCM words transmitted on the respective TDM trunk, so that the TDM trunk concerned in each time slot is connected with the memory location of the storage allocated to individual time slots. In the example described herein each of the storages comprises 32 memory locations 0 . . . 31 corresponding to 32 time slots in the system time frame.

The two storages KVSP1, GVSP1; . . . ; KVSP15, GVSP15 of the individual TDK trunks KL1, GL1; . . . ; LK15 can each be accessed be addressing holding storage from a HSPV1 . . . HSPV15 allocated to individual TDM trunks so that the individual PCM words in the switching center can be retransmitted to transmission circuits. To access the crosspoint switches disposed on one and the same incoming TDM trunk and those located on the associated outgoing TDM trunk, there is provided a common address cyclic memory. Thus, for access to crosspoint switches 1k1 ; . . . 15k1; 1k2 . . . 15k2; . . . 1k14 . . . 15k14; 1k15 . . . 15k15 leading from the incoming TDM trunks KL1 . . . KL15 to one and the same link and the link in question. The EG, the other of the latter being connected to the output of the parity generator PG. The exclusive OR element EG generates in the known manner a signal at its output D in case of dissimilarity between it inlet signals.

A parity generator PG forms the modulo-2 addition (without carry) of the input bits routed thereto. The parity generator PG may have a design of known construction for this purpose. For example, depending on the number of incoming TDM trunks, it may be composed of one or two SN 74,180 modules AG. The exclusive OR element EG which generates an output signal in case of dissimilarity between its two input signals may, for example, be composed of a functional element of an SN 7486 module by Texas Instruments Inc. or an FLH module by Siemens AG.

In the time slots in which no call is currently conducted over a link and in which, therefore, no message bits 1 appear on the input lines of the OR element OZ of the link concerned, the associated parity generator transmits, at its output, a signal O is likewise routed to the other input of the exclusive OR element EG from the output of the OR element OZ, so that no signal appears at the output of the exclusive OR element EG.

If in a given time slot one connection is currently applied to the link under consideration, a message bit 1 might occur on one of the input lines of the OR element OZ of the link which appears at the same time at the output of the OR element. The associated parity generator PG then generates at its output a signal 1 so that the exclusive OR element EG is again inhibited and no signal 1 appears at its output.

If, however, a double connection appears mistakenly on the link in question in a time slot, or even a multiple connection involving still another parity, then message bits 1 may appear concurrently on two input lines of the OR element OZ of the link concerned immediately after such a connection has been set up, since it is highly probable that two identical message bits will appear. This is true of double connections involving only one third party, as well as multiple connections involving still other "third" parties, that is, for an even number as well as for an odd number of parties sharing the multiple connection.

Upon the appearance of two or, generally speaking, an even number of such information bits 1 on two or simply an even number of input lines of the OR element OZ, the associated parity generator PG generates a signal "O" at its output corresponding to the even number of bits 1, which signal travels to one input of the following exclusive OR element EG. At the same time, there presently appears at the output of the OR element OZ of the link in question an information bit 1, which travels to the other input of the exclusive OR element EG also, so that presently there appears at the output D of the exclusive OR element in question a signal 1 indicating the double connection, which signal can then be utilized for releasing the double connection mistakenly established in the time slot in question.

The preferred embodiment described hereinabove is intended only to be exemplary of the principles of the invention and not to define the scope of the invention, which is defined by the appended claims.

I claim:

1. In a telecommunication switching system for time division multiplex (TDM) signals wherein incoming TDM trunks, coupled through first time coupling stages in the form of storages allocated to individual TDM trunks, are connectable in pairs, by means of crosspoint switches, over pairs of TDM links to outgoing TDM trunks which are coupled through second time coupling stages having storages allocated to individual TDM trunks, apparatus for detecting double connections comprising:

OR gate means having a plurality of inputs and an output inserted in a said TDM link, said inputs being connected to outputs of said crosspoint switches connecting the incoming TDM trunks with said TDM link and said output being connected to crosspoint switches connecting said TDM link to said outgoing TDM trunks, parity generator means having a plurality of inputs connected to said plurality of inputs of said OR gate means, and exclusive OR gate means for producing an output signal responsive to a dissimilarity in signals coupled thereto and thereby indicating a double connection, said exclusive OR gate having one input connected to an output of said parity generator means and another input connected to the output of said OR gate means.

* * * * *